United States Patent
Mayne et al.

(10) Patent No.: US 9,565,394 B2
(45) Date of Patent: Feb. 7, 2017

(54) SYSTEM FOR DISPLAYING AN IMAGE

(75) Inventors: Geoffrey C Mayne, San Diego, CA (US); David Bradley Short, San Diego, CA (US); Daniel Weinstein, San Diego, CA (US); Dan Riedler, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/375,809

(22) PCT Filed: Apr. 24, 2012

(86) PCT No.: PCT/US2012/034787
§ 371 (c)(1),
(2), (4) Date: May 11, 2015

(87) PCT Pub. No.: WO2013/162515
PCT Pub. Date: Oct. 31, 2013

(65) Prior Publication Data
US 2015/0244983 A1    Aug. 27, 2015

(51) Int. Cl.
*H04N 7/14* (2006.01)
*H04N 7/15* (2006.01)
(Continued)

(52) U.S. Cl.
CPC ............... *H04N 7/15* (2013.01); *G09G 3/001* (2013.01); *H04N 5/2628* (2013.01); *H04N 7/142* (2013.01); *H04N 7/144* (2013.01); *H04N 7/147* (2013.01)

(58) Field of Classification Search
None
See application file for complete search history.

(56) References Cited

U.S. PATENT DOCUMENTS 7,023,536 B2    4/2006 Zhang et al.
7,038,846 B2    5/2006 Mandella et al.
(Continued)

FOREIGN PATENT DOCUMENTS

JP    2002-027419    1/2002
JP    2002-062842    2/2002
(Continued)

OTHER PUBLICATIONS

Andrew D. Wilson et al., "Combining Multiple Depth Cameras and Projectors for Interactions on, Above, and Between Surfaces," UIST'10; Oct. 3, 2010; New York, New York; pp. 1-10, ACM; Available at: <research.microsoft.com/en-us/um/people/awilson/publications/WilsonUIST2010/WilsonUIST2010.html>.

(Continued)

*Primary Examiner* — Maria El-Zoobi
(74) *Attorney, Agent, or Firm* — HP Inc. Patent Department

(57) ABSTRACT

A system and a method for displaying an image are disclosed herein. The system includes a surface on which the image is displayed and a display rendering device to display the image on the surface. The system also includes a capture device to detect the surface, a processor, and a non-transitory computer-readable storage medium including instructions that cause the processor to: determine dimensions of the surface, determine a first orientation of the surface, convert the image to display on the surface based on the determined dimensions of the surface and the determined first orientation of the surface, detect repositioning of the surface to a second orientation, determine the second orientation of the surface, and convert the image to display on the surface based on the determined dimensions of the surface and the determined second orientation of the surface relative to the capture device.

12 Claims, 9 Drawing Sheets

(51) Int. Cl.
*G09G 3/00* (2006.01)
*H04N 5/262* (2006.01)

(56) References Cited

U.S. PATENT DOCUMENTS

| | | | |
|---|---|---|---|
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl et al. |
| 7,209,160 | B2 | 4/2007 | McNelley et al. |
| 7,268,956 | B2 | 9/2007 | Mandella et al. |
| 7,352,913 | B2 * | 4/2008 | Karuta .............. G02B 27/0025 348/746 |
| 7,474,809 | B2 | 1/2009 | Carl et al. |
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 2002/0021418 | A1 | 2/2002 | Raskar |
| 2005/0168437 | A1 | 8/2005 | Carl et al. |
| 2010/0231811 | A1 * | 9/2010 | Sajadi .................. H04N 9/3194 348/745 |
| 2010/0238265 | A1 | 9/2010 | White |
| 2010/0295920 | A1 | 11/2010 | McGowan |
| 2010/0302344 | A1 | 12/2010 | Large et al. |
| 2011/0227915 | A1 | 9/2011 | Mandella et al. |
| 2012/0038549 | A1 | 2/2012 | Mandella et al. |
| 2013/0194418 | A1 | 8/2013 | Gonzalez-Banos et al. |

FOREIGN PATENT DOCUMENTS

| | | |
|---|---|---|
| JP | 2003-153126 | 5/2003 |
| JP | 2004-274283 A | 9/2004 |
| WO | WO-01/47259 A1 | 6/2001 |

OTHER PUBLICATIONS

Andrew D. Wilson, "Using a Depth Camera as a Touch Sensor," ITS 2010: Devices & Algorithms; Nov. 7, 2010; Saarbrucken, Germany; pp. 69-72, ACM, Available at: <research.microsoft.com/en-us/um/people/awilson/publications/WilsonITS2010/WilsonITS2010.html>.

Beverly Harrison and Ryder Ziola, "Bringing Toys to Life: Intel Labs Oasis Project," Augmented Engineering; Jan. 26, 2011; 1 page, Available at: <augmentedengineering.wordpress.com/2011/01/26/bringing-toys-to-life-intel-labs-oasis-project/>.

Bjorn Hartmann et al., "Pictionaire: Supporting Collaborative Design Work by Integrating Physical and Digital Artifacts," CSCW 2010; Feb. 6, 2010; Savannah, Georgia; pp. 1-4, Available at: <research.microsoft.com/en-us/um/people/awilson/publications/HartmannCSCW2010/HartmannCSCW2010.html>.

Chris Harrison et al., "OmniTouch: Wearable Muititouch Interaction Everywhere," UIST'11; Oct. 16, 2011; Santa Barbara, California; pp. 441-450, ACM, Available at: <research.microsoft.com/en-us/um/people/awilson/publications/HarrisonUIST2011/HarrisonUIST2011.html>.

Donald Melanson, "Microsoft Research Working on Portable Surface," Mar. 2, 2010, pp. 1-2, Available at: <engadget.com/2010/03/02/microsoft-research-working-on-portable-surface/>.

Donald Melanson, "Wiimote Repurposed for Multi-Point Interactive Whiteboard," Dec. 10, 2007, pp. 1-2, Available at: <engadget.com/2007/12/10/wiimote-repurposed-for-multi-point-interactive-whiteboard/>.

Gao, Rui et al; Microsoft Research—Mobile Surface; Microsoft Research; 2010; 1 page; Available at: <research.microsoft.com/en-us/projects/mobilesurface/>.

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Ken Hinckley et al., "Pen+Touch=New Tools," UIST'10; Oct. 3, 2010; New York, New York; pp. 27-36, ACM, Available at: <research.microsoft.com/en-us/um/people/awilson/publications/HinckleyUIST2010/HinckleyUIST2010.html>.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Sasa Junuzovic et al., Microsoft Research—IllumiShare, Microsoft Research, 2012, pp. 1-2.

Shahram Izadi et al., "C-Slate: A Multi-Touch and Object Recognition System for Remote Collaboration Using Horizontal Surfaces," Second Annual IEEE International Workshop on Horizonal Interactive Human-Computer System, 2007, pp. 3-10, Available at: <research.microsoft.com/pubs/132551/cslate1.pdf>.

Shaun K. Kane et al., "Bonfire: A Nomadic System for Hybrid Laptop-Tabletop Interaction," UIST'09, Oct. 4, 2009; Victoria, British Columbia, Canada; pp. 129-138, Available at: <dub.washington.edu/djangosite/media/papers/uist09.pdf>.

Tom Simonite, "A Kitchen Countertop With a Brain," MIT Technology Review; Jul. 2, 2010, pp. 1-2, Available at: <technologyreview.com/news/419639/a-kitchen-countertop-with-a-brain/>.

David Pogue, "Solving a Video Chat Problem," Pogue's Posts, The Latest in Technology from David Pogue, NY Times, Jan. 24, 2007, 1 page, Available at: <pogue.blogs.nytimes.com/2007/01/24/solving-a-video-chat-problem/>.

Franc Solina and Robert Ravnik, "Fixing Missing Eye-Contact in Video Conferencing Systems," Proceedings of the ITI 2011 33rd Int. Conf. on Information Technology Interfaces, Jun. 27-30, 2011, pp. 233-236 Cavtat, Croatia, IEEE, Available at: <http://ieeexplore.ieee.org/search/srchabstract.jsp?tp=&arnumber=5974027>.

International Search Report and Written Opinion, International Application No. PCT/US2012/034787, Date of Mailing: Dec. 28, 2012, pp. 1-7.

Johnny Chung Lee, "Projector-Based Location Discovery and Tracking," Human Computer Interaction Institute, CMU-HCII-08-12, May 2008, pp. 1-106, Available at: </johnnylee.net/projects/thesis/thesis_document.pdf>.

* cited by examiner

SYSTEM FOR DISPLAYING AN IMAGE

BACKGROUND

Consumers appreciate ease of use and flexibility in electronic devices. Adaptability to the needs of consumers is also desirable. Businesses may, therefore, endeavor to design electronic devices directed toward one or more of these objectives.

BRIEF DESCRIPTION OF THE DRAWINGS

The following detailed description references the drawings, wherein.

DETAILED DESCRIPTION

Figure 1:
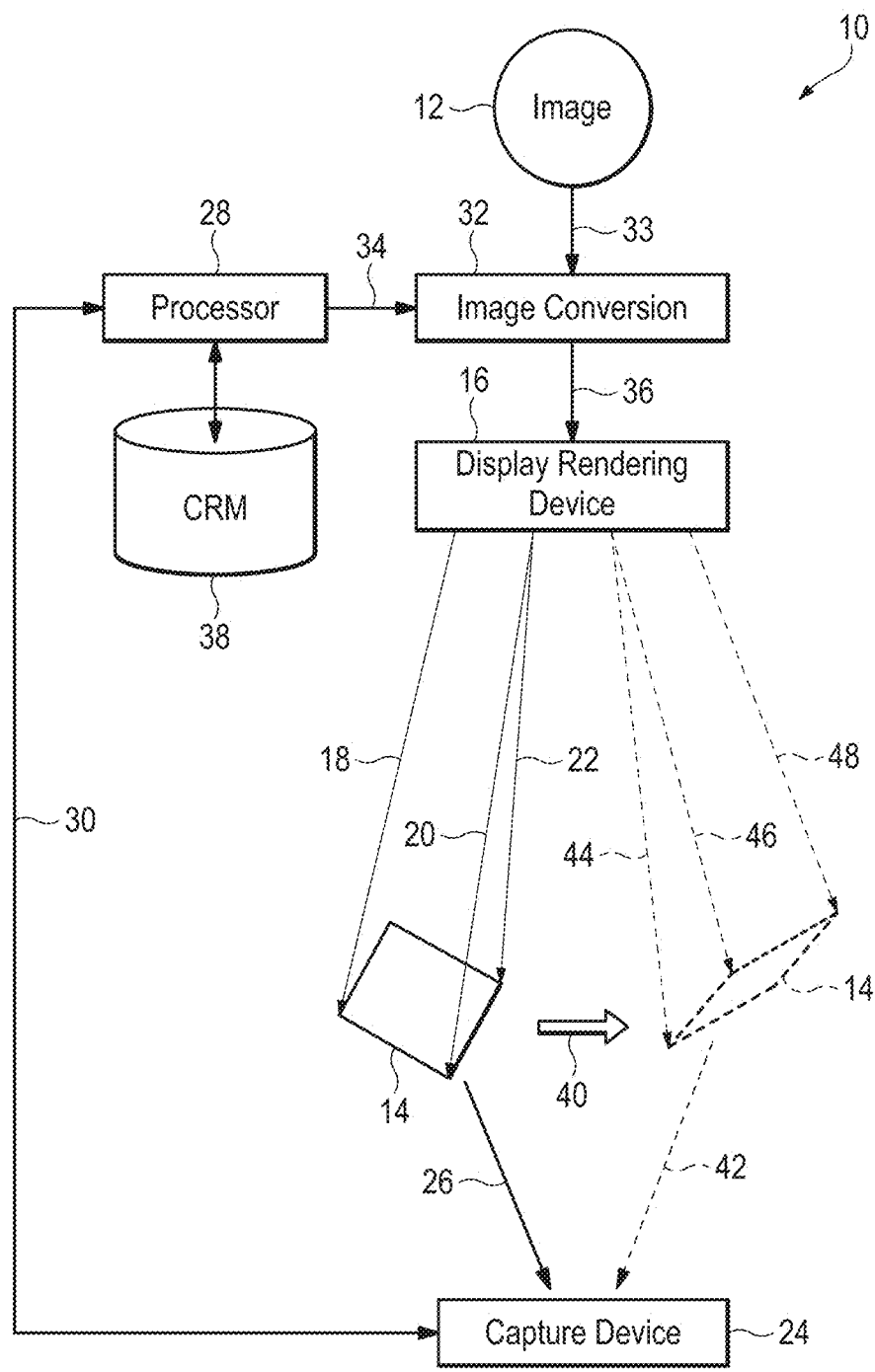
FIG. 1 is an example of a system for displaying an image on a surface.

People often value eye contact during conversations for a variety of reasons, such as enhancing a sense of connectedness, attention, interest and understanding. This can be challenging to achieve in the context of videoconferencing systems due to the placement of system cameras relative to system displays. For example, when a user of a videoconferencing system in one location looks at the image of another person at a different location connected to the system, that user cannot also simultaneously look directly at the camera capturing his or her image. The larger the distance between the camera and the display showing the projected person at a particular location, the greater the lack of eye contact can be between that user and the person.

This situation can be exacerbated during videoconferences involving multiple users at one location where only one camera is present. For example, all of the users at the one location may not be visible at the same time on the display at the other remote location. If multiple users at one location are visible, then their distances from the camera at that location may be different. This can result in differing degrees of lack of eye contact of their images at the remote location.

Another problem that can arise with such videoconferencing systems occurs in the context of remote users working with shared content. For example, the displayed image of a remote user may obscure part or all of a local working environment on which the shared content is positioned or displayed. Additionally or alternatively, the remote user may be too far from the remote working environment for his or her image to be visible on a local display, thereby hindering the goal of collaboration through such videoconferencing.

As used herein, the terms "displaying", "display" and "displayed" are defined to include, but are not limited to, projecting and projection. The term "image" is defined to include, but is not limited to, one or more video streams of the same or different content. This image may come from any of a variety of sources such as the internet, a computer, a handheld device (e.g., mobile phone, tablet or personal digital assistant (PDA)), etc. This image may also be in any of a variety of formats such as MPEG, PDF, WAV, JPEG, etc.

The term "display rendering device" is defined to include, but is not limited to, a projector. The term "camera" is defined to include, but is not limited to, a device that captures visible content or data associated with one or more persons or objects for subsequent display. The term "surface" is defined to include, but is not limited to, any two or three-dimensional object having an area or volume on which an image may be displayed (e.g., a screen). The term "orientation" includes, but is not limited to, X, Y and Z Cartesian coordinates on a working environment, as well as angles relative to the working environment (e.g., $<_x$, $<_y$, and $<_z$ or roll, pitch and yaw). The term "capture device" is defined to include, but is not limited to, an imaging device, sensor or detector.

As used herein, the terms "non-transitory storage medium" and non-transitory computer-readable storage medium" refer to any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as floppy diskettes or hard drives, magnetic tape, a random access memory (RAM), a read-only memory (ROM), an erasable programmable read-only memory, a flash drive, a compact disc (CD), or a digital video disk (DVD).

As used herein, the term "processor" refers to an instruction execution system such as a computer/processor based system, an Application Specific Integrated Circuit (ASIC), or a hardware and/or software system that can fetch or obtain the logic from a non-transitory storage medium or a non-transitory computer-readable storage medium and execute the instructions contained therein.

An example of a system 10 for displaying an image 12 that is directed to addressing those issues discussed above with videoconferencing systems is shown in FIG. 1. As can be seen in FIG. 1, system 10 includes a surface 14 on which image 12 is displayed. System 10 also includes a display rendering device 16 to display image 12 on surface 14, as indicated by arrows 18, 20 and 22, and a capture device 24 to detect surface 14, as indicated by arrow 26. System 10 additionally includes a processor 28 coupled to capture device 24, as indicated by arrow 30, and to display rendering device 16 via image conversion device 32, as indicated by arrows 34 and 36. Image conversion device 32 performs processing on image 12, as indicated by arrow 33, so that it is in a proper format to be utilized by display rendering device 16.

System 10 further includes a non-transitory computer-readable storage medium 38. Non-transitory computer-readable storage medium 38 includes instructions that, when executed by processor 28, cause processor 28 to determine the dimensions (e.g., length and width) of surface 14 detected by capture device 24 and to determine a first orientation in space of surface 14 relative to capture device 24. Non-transitory computer-readable storage medium 38 includes additional instructions that, when executed by processor 28, cause processor 28 to convert image 12 through the use of image conversion device 32 to display on surface 14 via display rendering device 16 based on the determined dimensions of surface 14 and the determined first orientation of surface 14 relative to capture device 24.

As can also be seen in FIG. 1, surface 14 may be moved by a user of system 10 from the first orientation shown in solid lines to the second orientation shown in dashed lines, as indicated by arrow 40. The user of system 10 may move surface 14 from the first orientation to the second orientation for a variety of reasons such as improving the sense of eye contact between the user and one or more users at a remote location. Another reason the user of system 10 may move surface 14 from the first orientation to the second orientation is to minimize the amount of working environment that is obscured or blocked by surface 14. This can be helpful when shared content is being projected or displayed in the working environment.

Non-transitory computer-readable storage medium 38 includes further instructions that, when executed by processor 28, cause processor 28 to detect this repositioning of surface 14 to the second orientation relative to capture device 24, as indicated by dashed arrow 42, and to determine the second orientation in space of surface 14 relative to capture device 24. Non-transitory computer-readable storage medium 38 includes yet further instructions that, when executed by processor 28, cause processor 28 to convert image 12 through the use of image conversion device 32 to display on surface 14 via display rendering device 16 based on the previously determined dimensions of surface 14 and the determined second orientation of surface 14 relative to capture device 24, as indicated by dashed arrows 44, 46 and 48.

Figure 2:
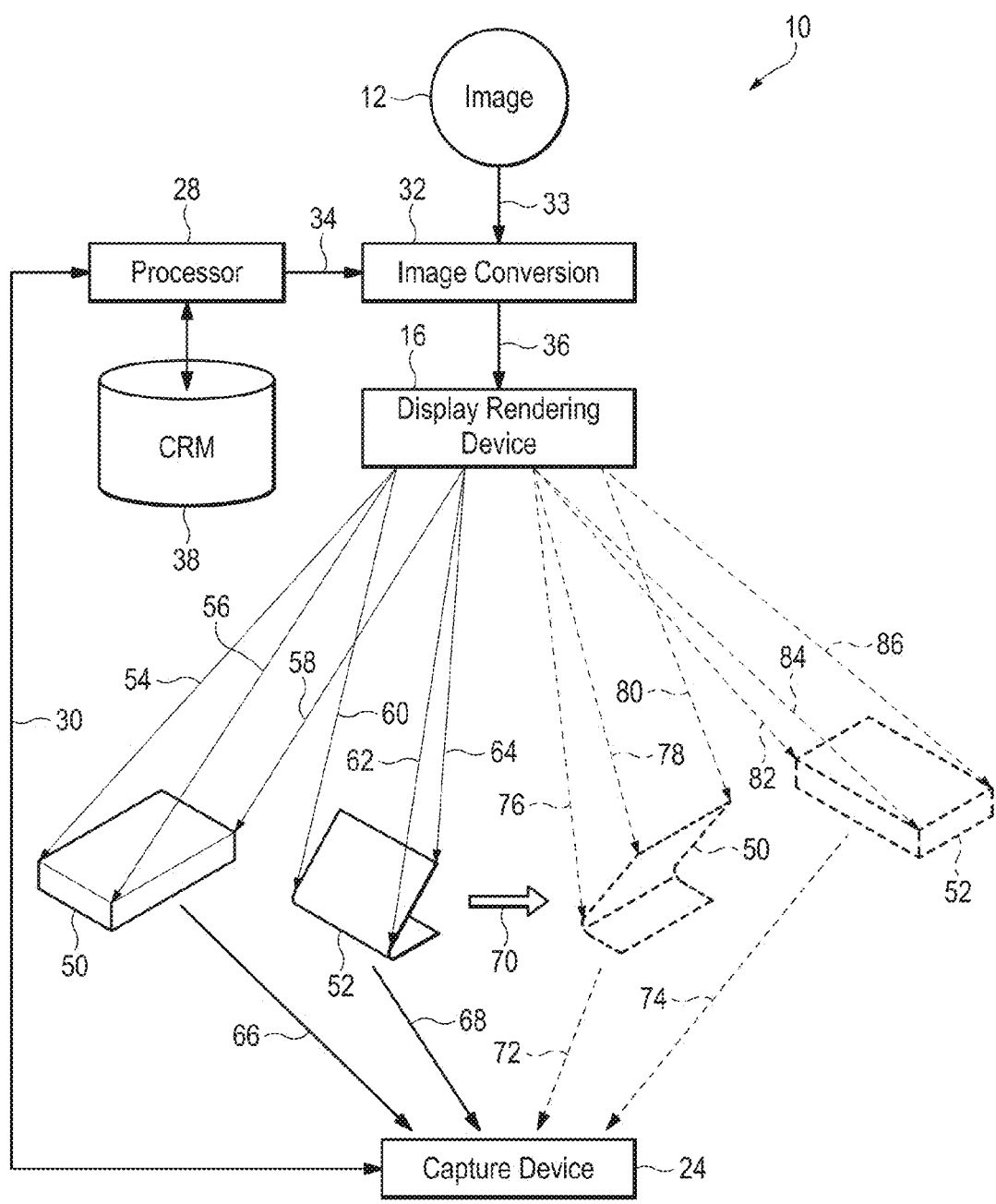
FIG. 2 is another example of the system of FIG. 1 for displaying an image on two surfaces.

Another example of system 10 for displaying image 12 on two surfaces 50 and 52 is shown in FIG. 2. Use of these two surfaces 50 and 52 can prove helpful in a variety of contexts and for a variety of reasons. For example, there may be too many users at a location for them to be displayed on only one of surfaces 50 and 52. As another example, if multiple users at one location are visible on a single surface, their distances from the camera at that location may be different. This can result in differing degrees of lack of eye contact of their images at the remote location. As a further example, a different image may be displayed on surface 50 than the image displayed on surface 52.

As can be seen in FIG. 2, display rendering device 16 displays image 12 on surface 50, as indicated by arrows 54, 56 and 58, and on surface 52, as indicated by arrows 60, 62 and 64. As can also be seen in FIG. 2, capture device 24 detects surface 50, as indicated by arrow 66 and surface 52, as indicated by arrow 68. Non-transitory computer-readable storage medium 38 includes instructions that, when executed by processor 28, cause processor 28 to determine the dimensions (e.g., length and width) of surface 50 detected by capture device 24 and to determine a first orientation in space of surface 50 relative to capture device 24. Non-transitory computer-readable storage medium 38 also includes instructions that, when executed by processor 28, cause processor 28 to determine the dimensions (e.g., length and width) of surface 52 detected by capture device 24 and to determine a second orientation in space of surface 52 relative to capture device 24. Non-transitory computer-readable storage medium 38 includes additional instructions that, when executed by processor 28, cause processor 28 to convert image 12 through the use of image conversion device 32 to display on surfaces 50 ad 52 via display rendering device 16 based on the determined dimensions of surfaces 50 and 52 and the respectively determined first and second orientations of surfaces 50 and 52 relative to capture device 24.

As can also be seen in FIG. 2, surfaces 50 and 52 may be moved by one or more users of system 10 from the respective first and second orientations shown in solid lines to the respective third and fourth orientations shown in dashed lines, as indicated by arrow 70. The user or users of the example of system 10 shown in FIG. 2 may move surfaces 50 and 52 from the respective first and second orientations to the respective third and fourth orientations for a variety of reasons such as those discussed above in connection with FIG. 1.

Non-transitory computer-readable storage medium 38 includes further instructions that, when executed by processor 28, cause processor 28 to detect this repositioning of surfaces 50 and 52 to the respective third and fourth orientations relative to capture device 24, as indicated by dashed arrows 72 and 74, and to determine the respective third and fourth orientations in space of surfaces 50 and 52 relative to capture device 24. Non-transitory computer-readable storage medium 38 includes yet further instructions that, when executed by processor 28, cause processor 28 to convert image 12 through the use of image conversion device 32 to display on surfaces 50 and 52 via display rendering device 16 based on the previously determined dimensions of surfaces 50 and 52, and the respective determined third and fourth orientations of surfaces 50 and 52 relative to capture device 24, as indicated by dashed arrows 76, 78 and 80 for surface 50 and dashed arrows 82, 84 and 86 for surface 52.

Figure 3:
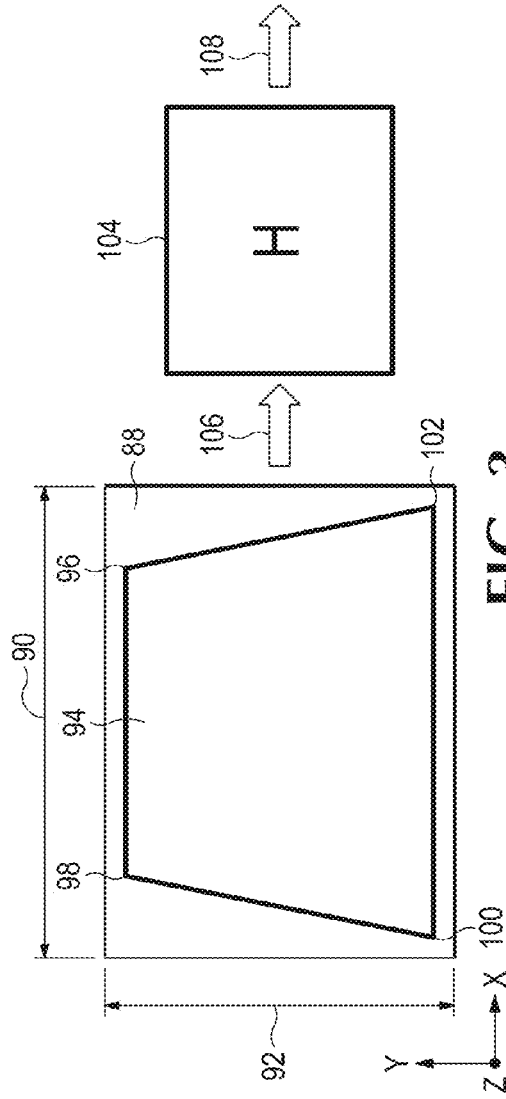
FIGS. 3 and 4 are examples of calibration of sensors of a capture device of the system of FIG. 1.
Figure 4:
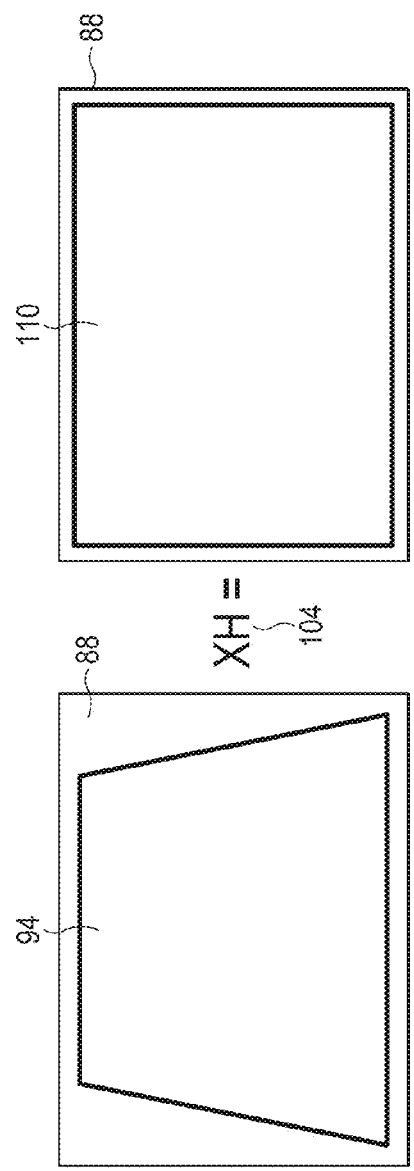

An example of calibration of sensors of capture device 24 is shown in FIGS. 3 and 4. As can be seen in FIG. 3, an area 88 covered by sensors of capture device 24 includes a width 90 and a height 92. As can also be seen in FIG. 3, display rendering device 16 has a projection area 94 bounded or defined by corner p1 96, corner p2 98, corner p3 100, and corner p4 102. In the example shown in FIGS. 3 and 4, area 88 is illustrated as being substantially rectangular and area 94 is illustrated as being substantially trapezoidal. It is to be understood however, that in other examples of the system for displaying an image, these areas may have different shapes. This is because any image shape can be projected onto any surface shape as long as at least two points of the projected image contact the outer edge of the surface upon which the image is projected.

A homography matrix (H) 104 may be created, as indicated by arrow 106, to perform this calibration as follows:

width 90=capture device WidthPixels/display rendering device WidthPixels height 92=capture device HeightPixels/display rendering device HeightPixels $s1=\{(display\ rendering\ device\ WidthPixels-1)*width\ 90, 0\}$ $s2=\{0, 0\}$ s3={0, (display rendering device HeightPixels−1)*height 92}
s4={(display rendering device WidthPixels−1)*width 90, (display rendering device HeightPixels−1)*height 92}
In={p1, p2, p3, p4}
Out={s1, s2, s3, s4}
$H_{104}$=perspectiveXfrm(In, Out).

Once corners p1 96, p2 98, p3 100, and p4 102 of projection area 94 within area 88 covered by sensors of capture device 24 have been determined and a homography matrix (H) 104 created, as illustrated in FIG. 3 and discussed above, data from capture device 24 is transformed with homography matrix (H) 104, as indicated by arrow 108 and illustrated in FIG. 4. This results in a transformation of the substantially trapezoidal shape of area 94 of display rendering device 16 to an area 110 that has a substantially rectangular shape that better fits or fills area 88 covered by sensors of capture device 24, which is also of a substantially rectangular shape, as illustrated in FIG. 4.

Figure 5:
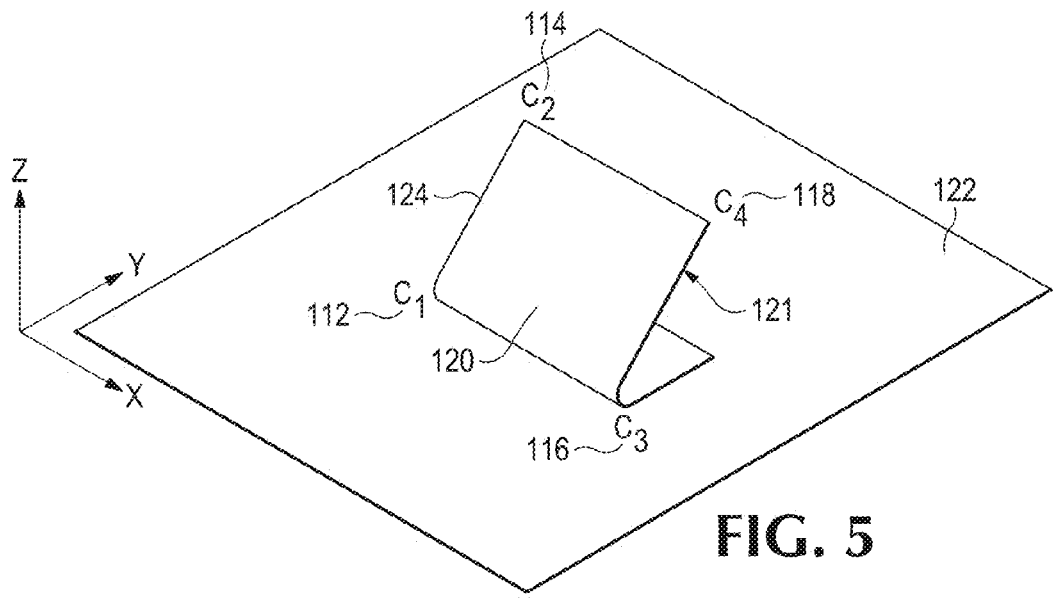
FIG. 5 is an example of one way in which corners of a surface may be located through the use of depth sensing.

Corners c1 112, c2 114, c3 116, and c4 118 of surface 120 of wedge 121 on which image 12 is displayed in working environment 122 need to be located. FIG. 5 is an example of one way in which corners c1, c2, c3, and c4 may be located by capture device 24 through the use of depth sensing. Specifically, corners 112, 114, 116, and 118 are determined from perimeter 124 of wedge 121 segmentation. The orientation of surface 120 in space is determined by capture device 24 based on the relative height of corners c1, c2, c3, and c4 from working environment 122.

Figure 6:
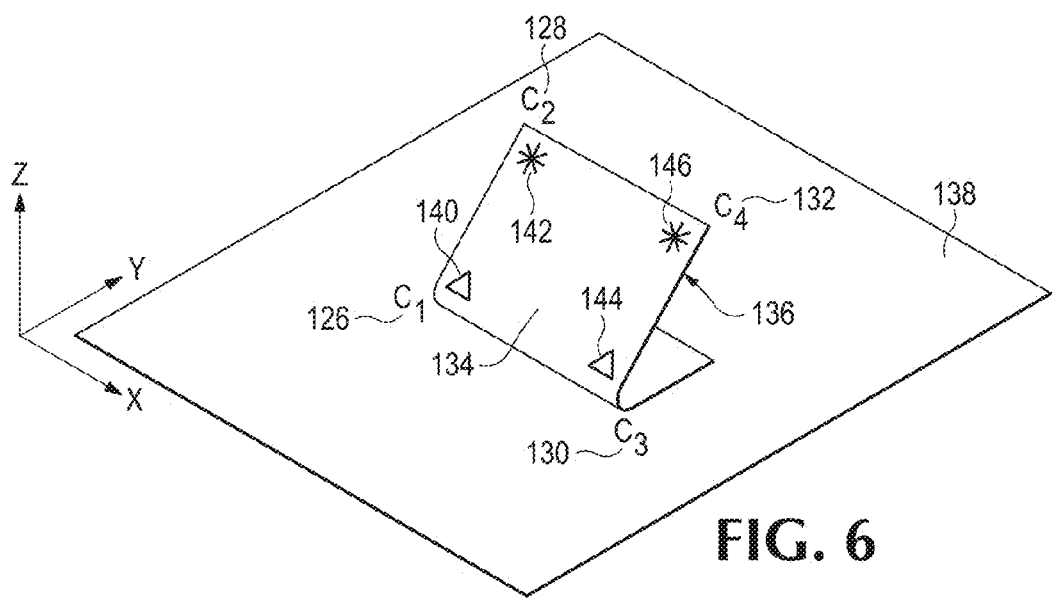
FIG. 6 is an example of another way in which corners of a surface may be located through the use of infrared (IR) or Red, Green and Blue (RGB) sensing.

An example of another way in which corners c1 126, c2 128, c3 130, and c4 132 of surface 134 of a different wedge 136 on which image 12 is displayed in working environment 138 may be located through the use of infrared (IR) or Red, Green and Blue (RGB) sensing by capture device 24 is shown in FIG. 6. This technique involves the use of fiducials 140, 142, 144 and 146 adjacent respective corners c1, c2, c3 and c4. In the case of RGB sensing, these fiducials may be unique marks that a designed so that fiducials 140 and 144 adjacent respective corners 126 and 130 are different from fiducials 142 and 146 adjacent respective corners 128 and 132. In the case of IR sensing by capture device 24, these fiducials may be infrared LEDs adjacent each of corners c1, c2, c3 and c4, with the infrared LEDs adjacent corners 126 and 130 being different from those located at corners 128 and 132. This difference can be chosen to be any of a variety of different characteristics such as color (i.e., wavelength), intensity, size, etc.

Capture device 24, utilizing this exemplary technique illustrated in FIG. 6, locates fiducials 140, 142, 144 and 146. Capture device 24 is able to determine the orientation of wedge 136 in space because top fiducials 142 and 146 are distinct from bottom fiducials 140 and 144. This in turn allows capture device 24 to determine the locations of corners c1, c2, c3 and c4 adjacent respective fiducials 140, 142, 144 and 146.

Figure 7:
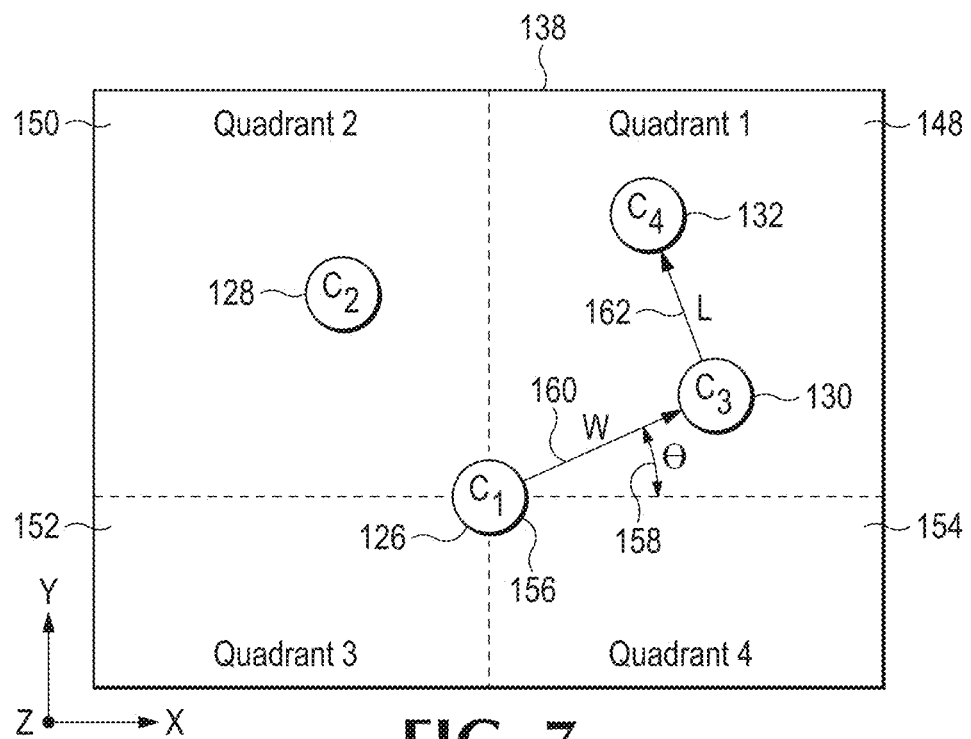
FIG. 7 illustrates an example of the determination of the dimensions and orientation of a surface within a working environment.

An example of the determination of the dimensions (e.g., length and width) of a surface, such as surface 134 of wedge 136, and its orientation in space is illustrated in FIG. 7. As can be seen in FIG. 7, corner c1 126 represents the bottom left corner of wedge 136 (see FIG. 6). Additionally, the portion of working environment 138 detectable or monitored by capture device 24 is divided into four quadrants, that is quadrant 1 148, quadrant 2 150, quadrant 3 152, and quadrant 4 154. Corners c1 126 and c3 130 are distinguishable from corners c2 128 and c4 132, as discussed above, and represent the front of surface 134 of wedge 136. Instructions on non-transitory computer-readable storage medium 38 cause processor 28 to determine which of the four quadrants corner c3 lies with respect to corner c1 which is represented as lying at an origin or intersection 156 of all four quadrants 148, 150, 152 and 154. The angle theta (Θ) 158 of the vector W 160 from corner c1 126 to corner c3 130 is the angle of orientation of surface 134 of wedge 136 within working environment 138 detectable or monitored by capture device 24. The distance from corner c1 to corner c3 represents the length of vector W 160 which corresponds to one of the two dimensions of surface 134 of wedge 136. The distance from corner c3 to corner c4 represents the length of vector L 162 which corresponds to the other of the two dimensions of surface 134 of wedge 136.

Figure 8:
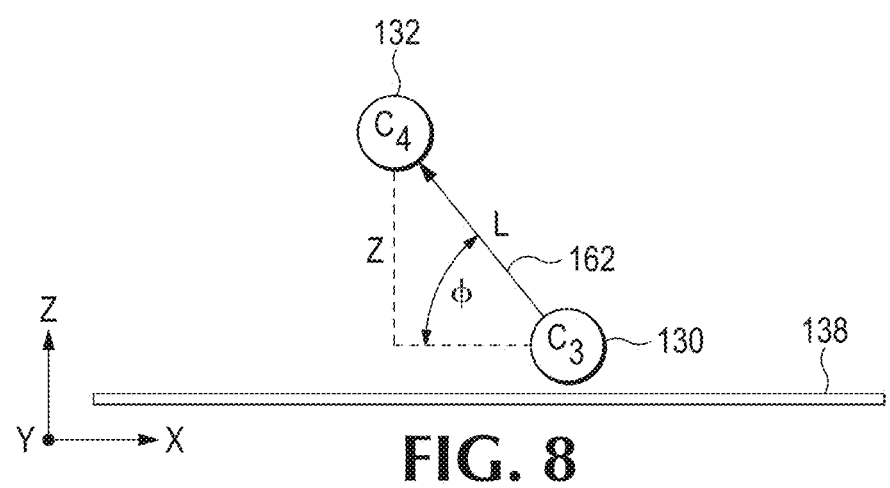
FIG. 8 illustrates an example of the determination of the angle phi ($\Phi$) of a surface from a working environment.

An example of the determination of the angle phi (Φ) of a surface, such as surface 134 of wedge 136, from working environment 138 is illustrated in FIG. 8. As can be seen in FIG. 8, the angle phi can be determined as follows:

$$\Phi=\tan^{-1}(z/L) \text{ where,}$$

L is the distance from corner c3 130 to corner c4 132 and is equal to the length of vector L 162, discussed above in connection with FIG. 7; and z is the relative "height" of c3 to c4 which can be determined through the use of a depth sensor of the type discussed above in connection with FIG. 5.

Figure 9:
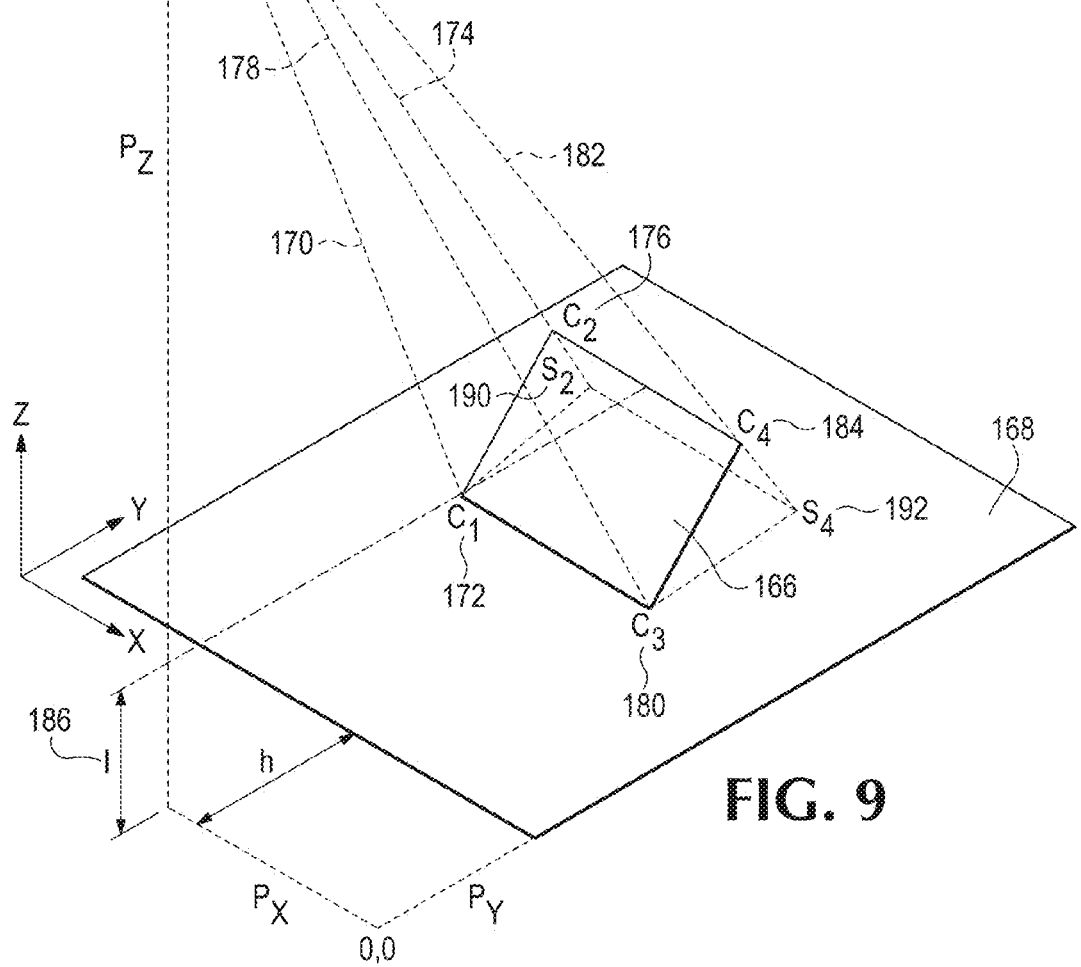
FIG. 9 is an example of transforming from a two-dimensional image provided by a display rendering device to a two-dimensional back-projection of a three-dimensional plane of a screen.

An example of transforming from a two-dimensional image provided by display rendering device 164 to a two-dimensional back-projection of a three-dimensional plane of surface 166 positioned in a working environment 168 is shown in FIG. 9. The basic method used is to construct a vector from display rendering device 164 to each corner of surface 166. In this example, vector 170 from display rendering device 164 to corner c1 172 of surface 166, vector 174 from display rendering device 164 to corner c2 176 of surface 166, vector 178 from display rendering device 164 to corner c3 180 of surface 166, and vector 182 from display rendering device 164 to corner c4 of surface 166. Next, each of vectors 170, 174, 178, and 182 is lengthened (as necessary) until it touches working environment 168 (in this case, vectors 174 and 182). Next, each vector is added to the corresponding location of display rendering device 164. This sum provides the three-dimensional to two-dimensional transformation for that corner.

For example, given that:
c1, c2, c3, and c4 are the corner locations of screen 166;
I 186 is the distance of the top of screen 166 from working environment 168;
P 188=[Px, 0, Pz] is the top-left coordinate of display rendering device 164; and
h is the offset from the top of display rendering device 164 to working environment 168.
Let C2 be the three-dimensional coordinate of c2.
Then C1=[c1x, c2y+h, I] and C4=[c4x, c4y+h, I]
A vector (V) is constructed from display rendering device 164 to each screen 166 corner (C) as follows: V=C−P.
Each vector (V) is lengthened so that it touches working environment 168: $V=V*(P_z/(P_z-1))$
Each vector (V) is then added to the corresponding location of display rendering device 164 providing the three-dimensional to two-dimensional transform for that corner: s=P+V.
In the example shown in FIG. 9, s1=c1, s2 is located at point 190 on working environment 168, s3=c3, and s4 is located at point 192 in working environment 168.

Next, the coordinates of the capture device (not shown in FIG. 9) are transformed to the coordinates of display rendering device 164. For example:

width capture device=display rendering device WidthPixels/capture device WidthPixels
height capture device=display rendering device HeightPixels/capture device HeightPixels
s1={(capture device WidthPixels−1)*width capture device, 0}
s2={0, 0}
s3={0, (capture device HeightPixels−1)*height capture device}
s4={(capture device WidthPixels−1)*width capture device, (capture device HieghtPixels−1)*height capture device}
p1={(display rendering device WidthPixels−1)*width capture device, 0}
p2={0, 0}
p3={0, (display rendering device HeightPixels−1)*height capture device}
p4={(display rendering device WidthPixels−1)*width capture device, (display rendering device HeightPixels−1)*height capture device}
In={s1, s2, s3, s4}
Out={p1, p2, p3, p4}
Homography Matrix (H)=perspectiveXfrm (In, Out)
S={s1, s2, s3, s4}
W=H×S
W=transformed two-dimensional coordinates of surface 166.

Figure 10:
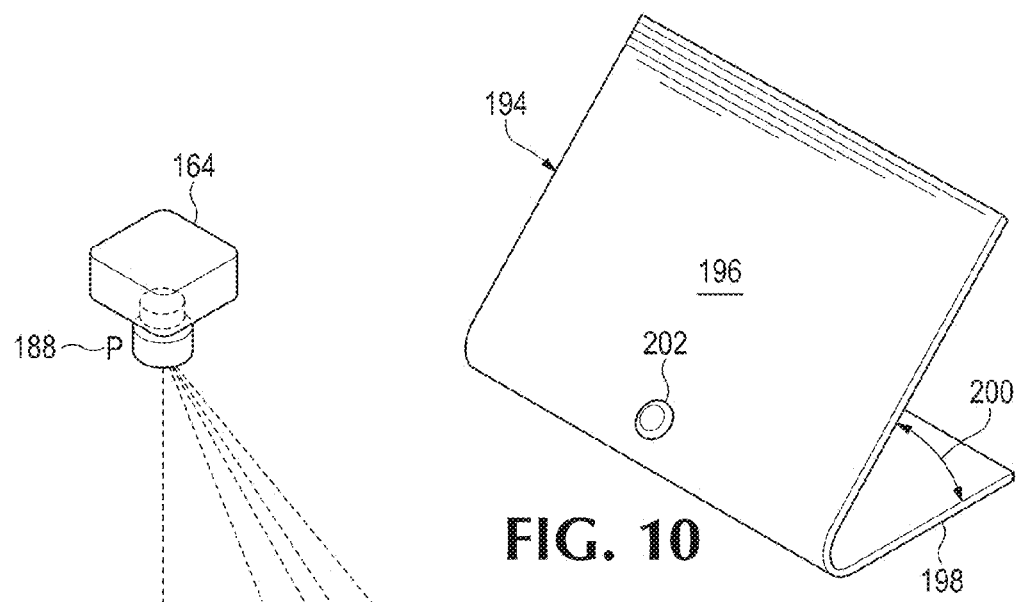
FIG. 10 is an example of a wedge or puck having a screen on which an image may be displayed.

An example of a wedge or puck 194 having a screen 196 on which image 12 may be displayed is shown in FIG. 10. As can be seen in FIG. 10, wedge 194 includes a base 198 that may be placed anywhere in a working environment (not shown) in a location and orientation in space convenient to one or more users. As can also be seen in FIG. 10, screen 196 is positioned at a fixed predetermined angle 200 with respect to base 198. In the example of shown in FIG. 10, angle 200 is selected to be within a range of approximately 40 to 70 degrees. In another example of a wedge or puck for use with system 10, angle 200 may be selected to be within a range of approximately 20 to 40 degrees.

As can further be seen in FIG. 10, wedge or puck 194 includes a camera 202 positioned at a location on wedge or puck 194 adjacent surface 196. Camera 202 is designed to capture one or more images of the user or users of wedge or puck 194 for display at a remote location. Although wedge or puck 194 is illustrated as having a fixed surface 196 at a predetermined angle 200 relative to base 198, it is to be understood that in other examples, surface 196 may be movable through a range of angles with respect to base 198.

Figure 11:
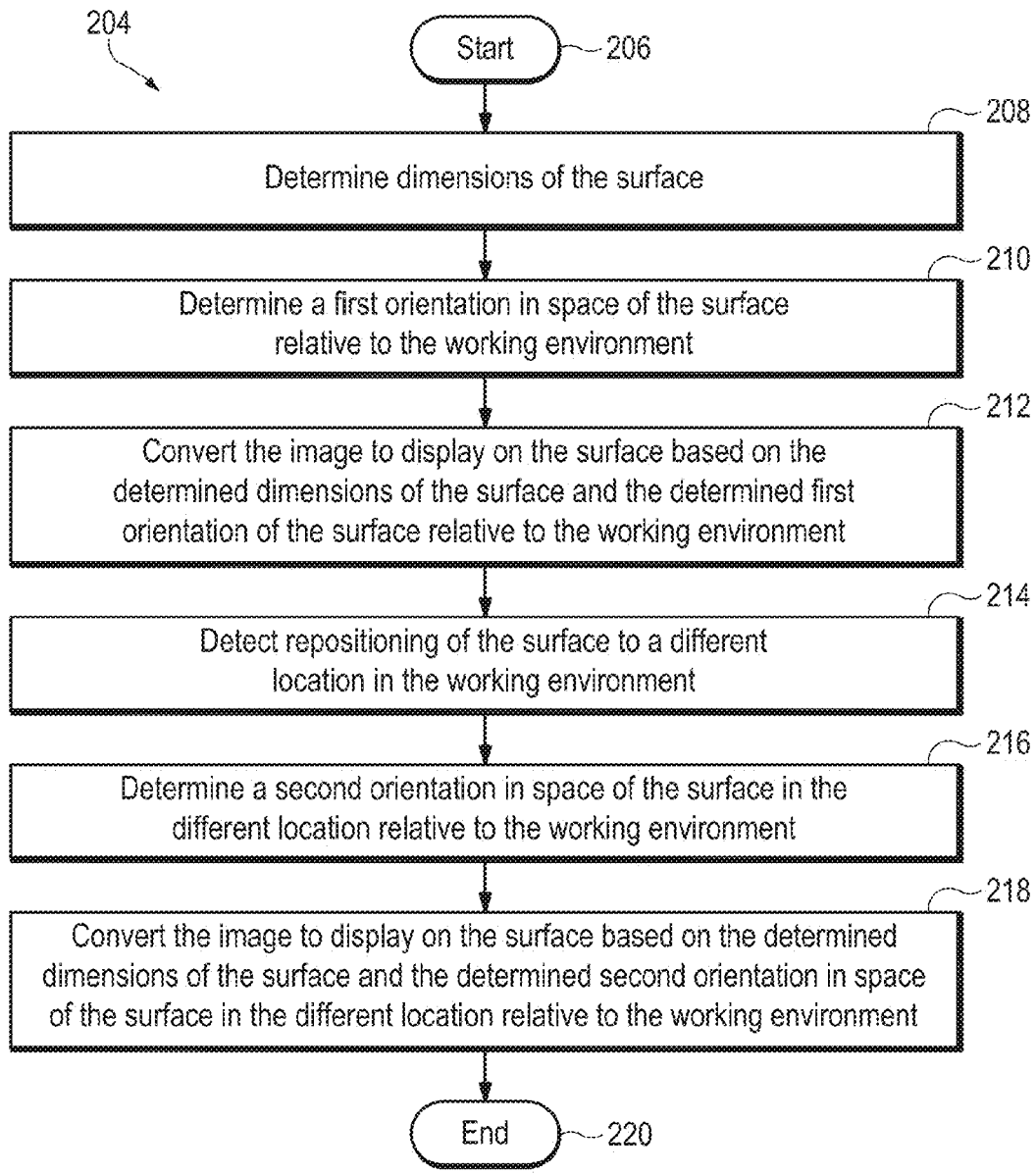
FIG. 11 is an example of a method of displaying an image on a surface located in a working environment.

An example of a method 204 of displaying an image on a surface located in a working environment is shown in FIG. 11. As can be seen in FIG. 11, method 204 starts or begins 206 by determining the dimensions of the surface, as indicated by block 208, and determining a first orientation in space of the surface relative to the working environment, as indicated by block 210. Method 204 then coverts the image to display on the surface based on the determined dimensions of the surface and the determined first orientation of the surface relative to the working environment, as indicated by block 212. Method 204 may then detect repositioning of the surface to a different location in the working environment, as indicated by block 214, and determine a second orientation in space of the surface in the different location relative to the working environment, as indicated by block 216. Method 204 may then convert the image to display on the surface based on the determined dimensions of the surface and the determined second orientation in space of the surface in the different location relative to the working environment, as indicated by block 218. Method 204 may then end 220.

Figure 12:
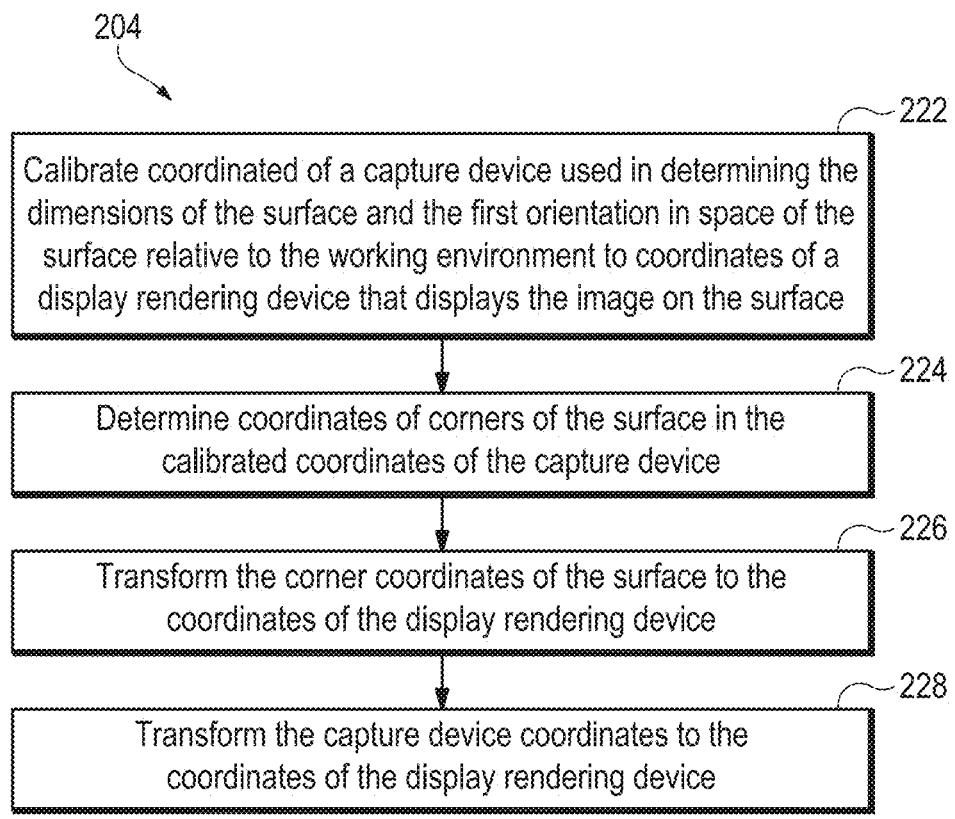
FIG. 12 is an example of additional elements of the method of FIG. 11.

As can be seen in FIG. 12, method 204 may also include the following additional elements. Method 204 may calibrate the coordinates of a capture device used in determining the dimensions of the surface and the first orientation in space of the surface relative to the working environment to the coordinates of a display rendering device that displays the image on the surface, as indicated by block 222, and determine coordinates of the corners of the surface in the calibrated coordinates of the capture device, as indicated by block 224. In such cases, method 204 may additionally transform the corner coordinates of the surface to the coordinates of the display rendering device, as indicated by block 226, and transform the capture device coordinates to the coordinates of the display rending device, as indicated by block 228.

Figure 13:
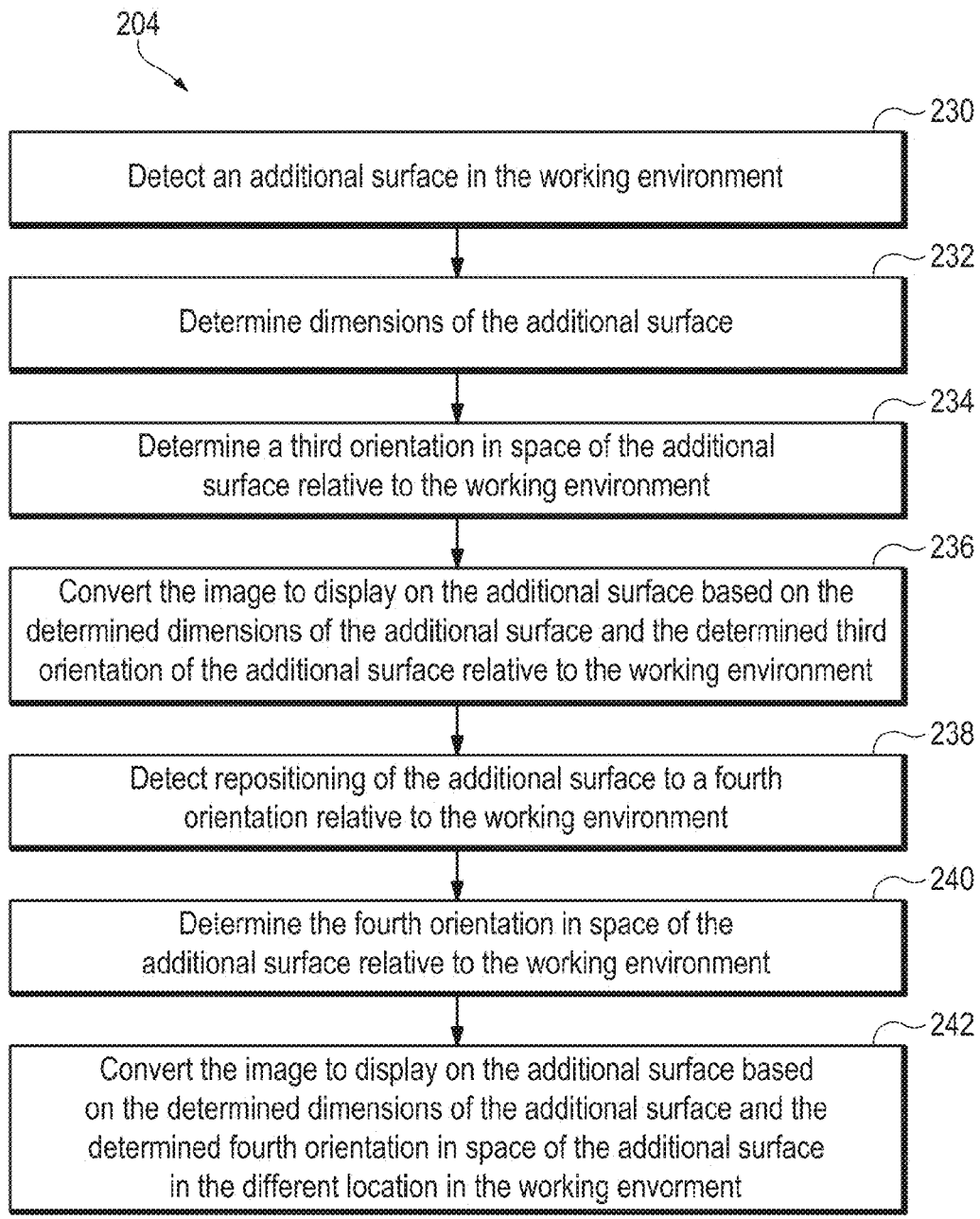
FIG. 13 is an example of further elements of the method of FIG. 11.

As can be seen in FIG. 13, method 204 may further include the following additional elements. Method 204 may detect an additional surface in the working environment, as indicated by block 230, and determine the dimensions of the additional surface, as indicated by block 232. Method 204 may also determine a third orientation in space of the additional surface relative to the working environment, as indicated by block 234, and convert the image to display on the additional surface based on the determined dimensions of the additional surface and the determined third orientation of the additional surface relative to the working environment, as indicated by block 236. In such cases, method 204 may further detect repositioning of the additional surface to a fourth orientation relative to the working environment, as indicated by block 238, and determine the fourth orientation in space of the additional surface relative to the working environment, as indicated by block 240. Method 242 may then convert the image to display on the additional surface based on the determined dimensions of the additional surface and the determined fourth orientation in space of the additional surface in the different location in the working environment, as indicated by block 242.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. For example, although two surfaces 50 and 52 have been illustrated in FIG. 2, it is to be understood that other examples of system 10 may use additional surfaces with the same or additional images, depending on the particular needs of the user or users or system 10. As another example, although capture device 24 is illustrated in FIGS. 1 and 2 as being below surfaces 14, 50, and 52, it is to be understood that in other examples of the system for displaying an image, capture device 24 may be located elsewhere (e.g., above the surface or surfaces and/or to a side). As a further example, although the system for displaying an image has been illustrated in the context of two locations, it is to be understood that it is not so limited. Rather, other examples of the system for displaying an image may be used for videoconferencing at three or more locations. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A system for displaying an image, comprising:
a surface on which the image is displayed;
an additional surface on which the image is displayed;
a display rendering device to display the image on the surface and on the additional surface;
a capture device to detect the surface and the additional surface;
a processor coupled to the capture device and the display rendering device; and
a non-transitory computer-readable storage medium including instructions that, when executed by the processor, cause the processor to:
determine dimensions of the surface and the additional surface detected by the capture device,
determine a first orientation in space of the surface relative to the capture device and a third orientation in space of the additional surface relative to the capture device,
convert the image to display on the surface via the display rendering device based on the determined dimensions of the surface and the determined first orientation of the surface relative to the capture device,
convert the image to display on the additional surface via the display rendering device based on the determined dimensions of the additional surface and the determined third orientation of the additional surface relative to the capture device,
detect repositioning of the surface to a second orientation relative to the capture device,
determine the second orientation in space of the surface relative to the capture device, and
convert the image to display on the surface via the display rendering device based on the determined dimensions of the surface and the determined second orientation of the surface relative to the capture device.

2. The system of claim 1, further comprising a plurality of fiducials adjacent the surface that are utilized by the capture device to detect the surface.

3. The system of claim 1, further comprising:
a working environment; and
a camera to record objects within a portion of the working environment, wherein the camera is coupled to the surface and movable with the surface.

4. The system of claim 1, wherein the non-transitory computer-readable storage medium includes additional instructions that, when executed by the processor, cause the processor to: detect repositioning of the additional surface to a fourth orientation relative to the capture device,
determine the fourth orientation in space of the surface relative to the capture device, and
convert the image to display on the surface via the display rendering device based on the determined dimensions of the surface and the determined fourth orientation of the surface relative to the capture device.

5. A method of displaying an image on a surface and on an additional surface located in a working environment, comprising:
determining dimensions of the surface and the additional surface;
determining a first orientation in space of the surface relative to the working environment and a third orientation in space of the additional surface relative to the working environment;
converting the image to display on the surface based on the determined dimensions of the surface and the determined first orientation of the surface relative to the working environment;
converting the image to display on the additional surface based on the determined dimensions of the additional surface and the determined third orientation of the additional surface relative to the working environment;
detecting repositioning of the surface to a different location in the working environment;
determining a second orientation in space of the surface in the different location relative to the working environment; and
converting the image to display on the surface based on the determined dimensions of the surface and the determined second orientation in space of the surface in the different location relative to the working environment.

6. The method of claim 5, further comprising:
calibrating coordinates of to capture device used in determining the dimensions of the surface and the first orientation in space of the surface relative to the working environment to coordinates of a display rendering device that displays the image on the surface; and
determining coordinates of corners of the surface in the calibrated coordinates of the capture device.

7. The method of claim 6, wherein converting the image to display on the surface based on the determined dimensions of the surface and the determined first orientation in space of the surface relative to the working environment includes:
transforming the corner coordinates of the surface to the coordinates of the display rendering device, and
transforming, the capture device coordinates to the coordinates of the display rendering device.

8. The method of claim 5, further comprising:
detecting repositioning of the additional surface to a fourth orientation relative to the working environment;
determining the fourth orientation in space of the additional surface relative to the working environment; and
converting the image to display on the additional surface based on the determined dimensions of the additional surface and the determined fourth orientation in space of the additional surface in the different location in the working environment.

9. The method of claim 5, further comprising recording objects within a portion of the working environment.

10. A non-transitory computer-readable storage medium comprising instructions that when executed by a processor of a system fix displaying an image on a surface and on an additional surface in a working environment, cause the processor to:
determine dimensions of the surface and the additional surface in the working environment;
determine a first orientation in space of the surface relative to the working environment and a third orientation in space of the additional surface relative to the working environment;
convert the image to display on the surface based on the determined dimensions of the surface and the determined first orientation of the surface relative to the working environment;

convert the image to display on the additional surface based on the determined dimensions of the additional surface and the determined third orientation of the additional surface relative to the working environment;
detect repositioning of the surface to a different location in the working environment;
determine a second orientation in space of the surface in the different location relative to the working environment; and
convert the image to display on the surface based on the determined dimensions of the surface and the determined second orientation in space of the surface in the different location relative to the working environment.

11. The non-transitory computer-readable storage medium of claim 10, further comprising instructions that, when executed by the processor, cause the processor to:
calibrate coordinates of a capture device of the system used in determining the dimensions of the surface and the first orientation in space of the surface relative to the working environment to coordinates of a display rendering device that displays the image on the surface; and
determine coordinates of corners of the surface in the calibrated coordinates of the capture device.

12. The non-transitory computer-readable storage medium of claim 10, further comprising instructions that, when executed by the processor, cause the processor to:
detect repositioning of the additional surface to a fourth orientation relative to the working environment;
determine the fourth orientation in space of the additional surface relative to the working environment; and
convert the image to display on the additional surface based on the determined dimensions of the additional surface and the determined fourth orientation in space of the additional surface in the different location in the working environment.

\* \* \* \* \*

UNITED STATES PATENT AND TRADEMARK OFFICE
CERTIFICATE OF CORRECTION

PATENT NO. : 9,565,394 B2  Page 1 of 1
APPLICATION NO. : 14/375809
DATED : February 7, 2017
INVENTOR(S) : Geoffrey C Mayne et al.

It is certified that error appears in the above-identified patent and that said Letters Patent is hereby corrected as shown below:

In sheet 9 of 9, reference numeral 242, Line 4, delete "envorment" and insert -- environment --, therefor.

In Column 10, Line 24 approx., in Claim 6, delete "of to" and insert -- of a --, therefor.

In Column 10, Line 39 approx., in Claim 7, delete "transforming," and insert -- transforming --, therefor.

In Column 10, Line 54, in Claim 10, delete "that" and insert -- that, --, therefor.

In Column 10, Line 55, in Claim 10, delete "fix" and insert -- for --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*